Nov. 11, 1958 W. E. MIZE 2,859,837
BRAKE FOR WHEEL CHAIR
Filed June 13, 1956 2 Sheets-Sheet 1
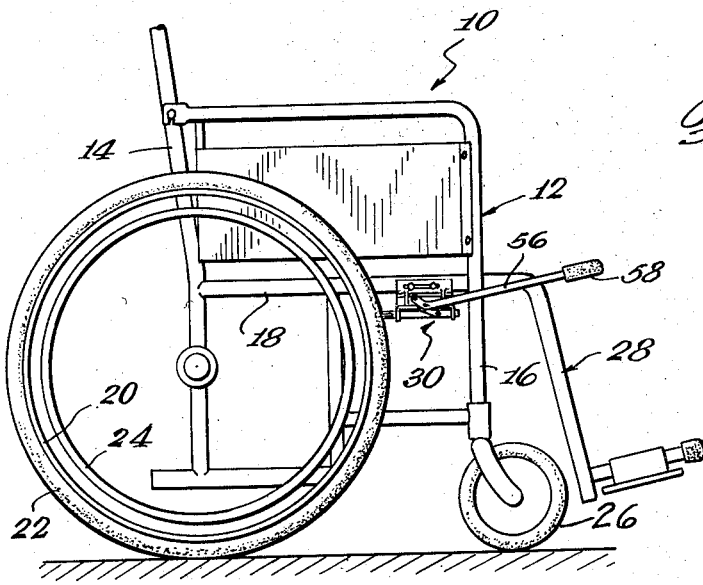
Fig. 1.
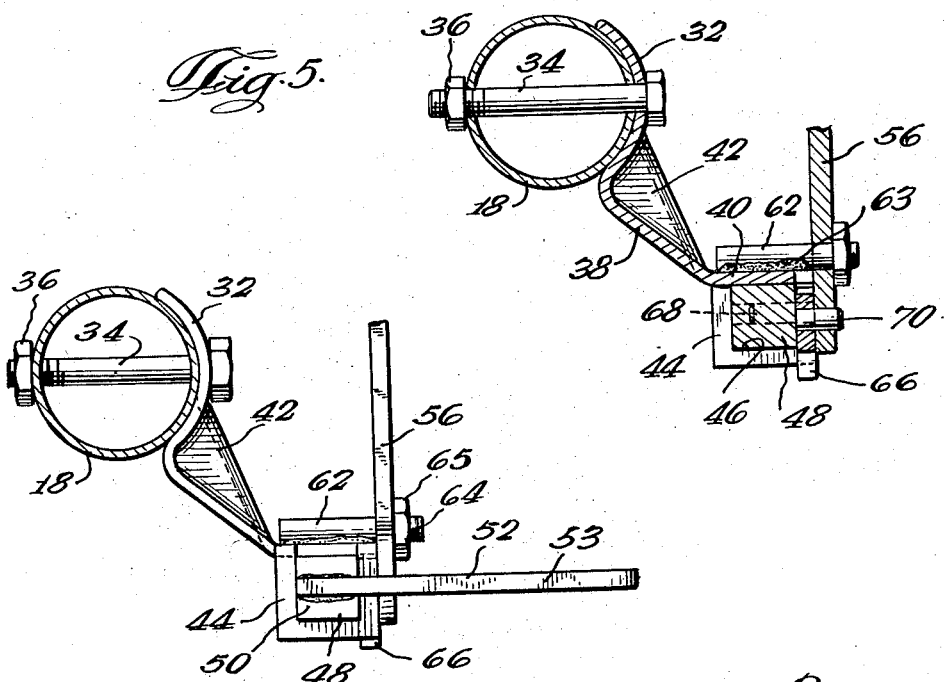
Fig. 5.
Fig. 6.
Inventor
William E. Mize
By Silverman + Mullin
Attorneys Nov. 11, 1958 W. E. MIZE 2,859,837
BRAKE FOR WHEEL CHAIR
Filed June 13, 1956 2 Sheets-Sheet 2
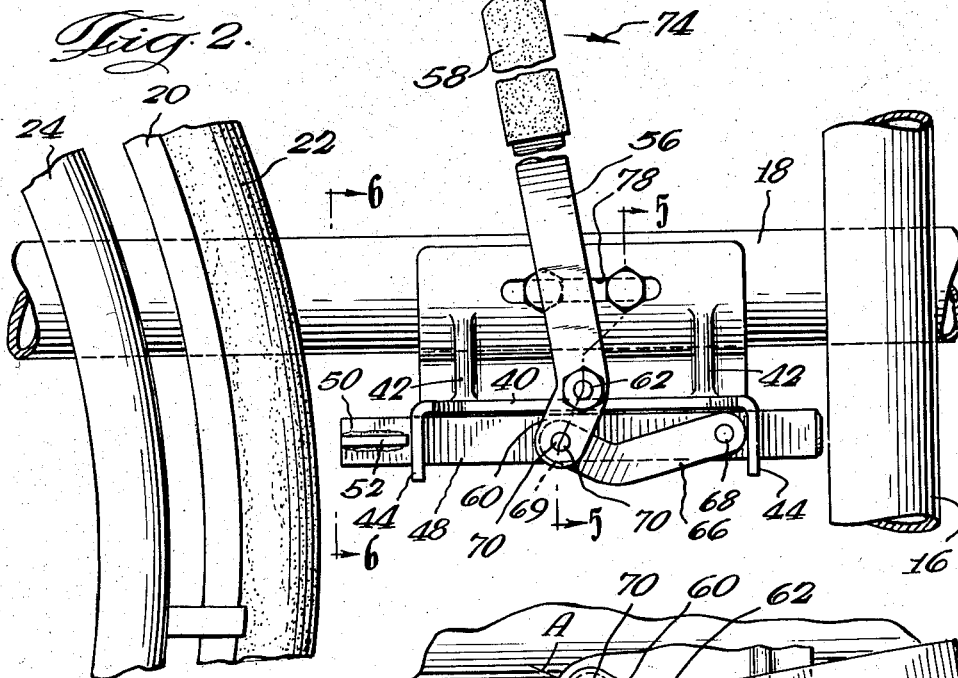
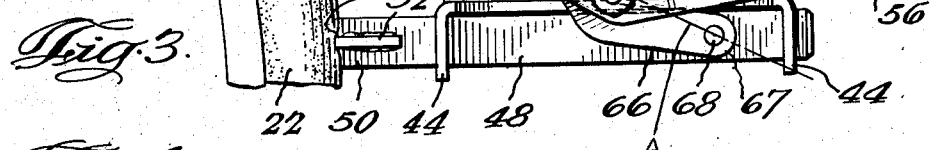
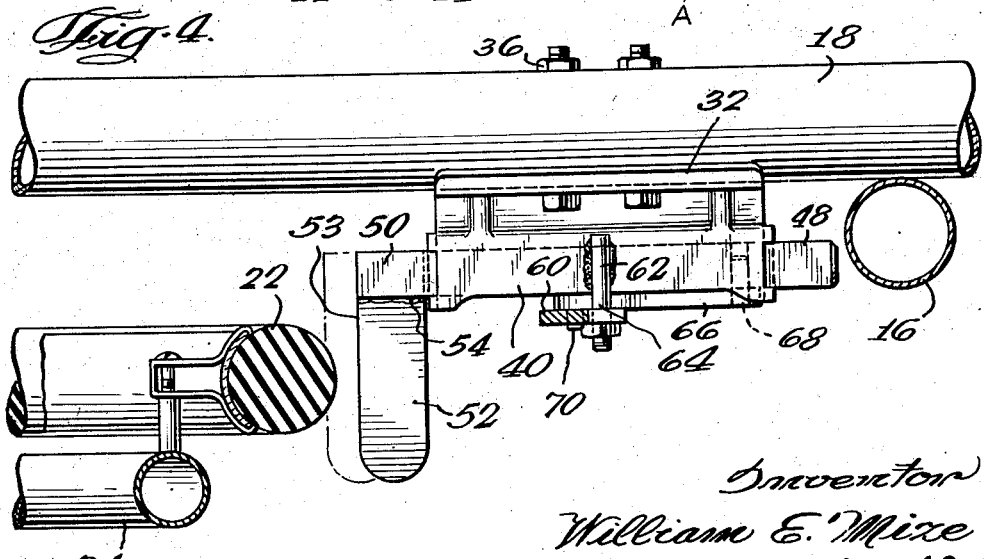
Inventor
William E. Mize
By Silverman + Mullin
Attorneys United States Patent Office 2,859,837
Patented Nov. 11, 1958

2,859,837
BRAKE FOR WHEEL CHAIR

William E. Mize, Ladoga, Ind., assignor, by mesne assignments, to Institutional Industries, Inc., a corporation of Ohio Application June 13, 1956, Serial No. 591,108

14 Claims. (Cl. 188—2)

This invention relates generally to invalid wheel chairs and more particularly, relates to a novel brake mechanism for wheel chairs which is capable of more universal installation on many different models of chairs than has heretofore been possible.

It is a principal object of this invention to provide a brake mechanism for wheel chairs which by reason of its particular construction may be operably installed on either the left or right side of the chair, and may be used in connection with drive wheels of varying diameter.

An important object of the invention is to provide a brake device for wheel chairs which utilizes a simple spring action toggle mechanism to enable application of substantial braking force by the chair occupant with relatively little strength and effort.

Another important object of the invention is to provide a brake mechanism of the character described which eliminates entirely the need for ratchets, spring members, and the like which have been so prevalently employed in the structures of the prior art to retain the brake in "holding" position.

Still another object of the invention is to provide a brake mechanism of the character described which comprises a manually operable lever connected to a brake shoe by means of a toggle joint which enables the lever to be positively and automatically locked at the end of the stroke thereof which causes application of the brake.

Other important objects of the invention reside in the provision of a brake mechanism of the character described which is characterized by its highly simple and economical construction which is readily installable and serviceable, which is adjustable for use with wheels of different diameters, and which requires a minimum amount of effort to operate.

These and other objects of the invention will become apparent as the disclosure evolves, in connection with which a detailed description of a preferred embodiment is set forth in the specification and is illustrated in the accompanying drawings. It is contemplated that minor variations in the size, arrangement, construction and proportion of the several parts thereof may occur to the skilled artisan without sacrificing any of the advantages or departing from the spirit of the invention.

In the drawings:

Fig. 1 is an elevational view of a wheel chair of representative construction having the brake mechanism embodying the invention installed thereon.

Fig. 2 is a fragmentary side elevational view of a side frame of said chair and showing the said brake mechanism in released position.

Fig. 3 is a view substantially similar to Fig. 2 showing the brake mechanism in locked position.

Fig. 4 is a transverse sectional view taken through the chair to illustrate the brake mechanism of the invention in top plan view.

Fig. 5 is a sectional view taken along the line 5—5 and Fig. 6 is a sectional view taken along the line 6—6 of Fig. 2 and in the direction indicated.

For the purpose of illustrating the environment in which the brake mechanism embodying the invention is intended to operate, there has been shown a representative wheel chair designated generally 10 in Fig. 1. The chair 10 may be either an outdoor or indoor model of either the non-folding or folding type having a pair of vertical side frames, such as side frame 12 shown in Fig. 1. Each such side frame preferably is formed of tubular metal and includes a vertical rear support post 14 and a vertical front support post 16. The horizontal cross-bar 18 provided on a said side frame intermediate the top and bottom ends thereof interconnects said vertical posts. In the model of chair illustrated, a drive wheel 20 is mounted in a suitable bearing on each rear post 14 which wheel mounts a rubber tire 22 and a concentric hand rim 24 for propelling the chair. A small pivotal caster wheel 26 is rotatably installed at the bottom end of each front support post in a well-known manner and the chair 10 usually will have a leg rest assembly 28 on each side frame.

The brake mechanism embodying the invention has been designated generally by the reference character 30. The mechanism includes a mounting bracket preferably integrally formed of metal. The upper end of the bracket is provided with a wide, concave seat 32 conforming to the curvature of the cross-bar 18 by means of which the bracket can be secured flush against the outside surface of the cross-bar. Suitable elongate bolts 34 accommodating nuts 36 at their threaded ends may be employed to fasten the bracket on the cross-bar, the bolts being extended through the seat 32 and the cross-bar in a well known manner. Integral with said seat 32 at its lower end is a downwardly and angularly extending portion 38 which is bent at its extremity to provide a flat, horizontally disposed shelf or plate 40 offset from the seat 32. The plate or shelf 40 extends outwardly of the side frame on which the bracket is mounted in a plane substantially parallel with and spaced from the axis of the cross-bar. Ribs 42 integral with the seat 32 and portion 38 provide for additional rigid suspension for the plate 40 in its horizontal disposition.

At each extremity of said plate 40 is formed a depending perforated ear 44. Consequently, as seen in Fig. 2, the plate 40 may be described as channel-shaped, with the legs thereof provided by said depending ears 44. Each ear or leg 44 has a transverse opening 46 therethrough which is aligned with the opening on the other leg. The openings 46 are aligned with their centers disposed on a line parallel to the plane of plate 40 and spaced below the same. A substantially L-shaped brake member is slidably mounted in said openings between said ears, said member including an elongate plunger or bar 48 whose opposite ends extend outwardly of the ears 44 through said openings. Secured to the protruding end 50 of said bar 48 by welding 54, for example, is a brake shoe 52 which is arranged transverse to the bar 48 and accommodated in the space between the adjacent ear 44 and the wheel 20. The brake shoe comprises a thin, flat plate or bar presenting a thin side edge 53 to the tire 22. The plunger or bar 48 is capable of sliding movement relative to the wheel 20 along a line which will carry the edge 53 against the tire 22 generally radially, although not necessarily so.

The braking lever of the mechanism 30 includes an elongate, flat handle portion 56 having a grip 58 at the upper end thereof disposed within convenient reach of the chair occupant. The opposite end of portion 56 is bent to provide a short offset section 60. Secured as by welding 63 in engagement with the upper surface of plate 40 is a stud or pivot shaft 62 which extends laterally across said plate and protrudes at an end thereof beyond the side edge of the plate. The braking lever 56 is rotatably mounted on said protruding end 64 by means of the nut 65, the pivot being arranged to pass through the juncture of body portion 56 and offset section 60. Thus, the pivot shaft 62 is disposed intermediate the ears 44 on the side of said plate opposite to that from which the bar 48 is slidably supported.

The lever 56 and sliding bar 48 are interconnected by means of a toggle joint provided by the bell-crank lever 66. One end 67 of said lever 66 is pivotally connected on one side of the pivot 62 to the bar 48 by means of the pin 68, the opposite end 69 being pivotally connected to the section 60 on the opposite side of pivot 62 by the pin 70. The axes of pivot 62, 68 and 70 are substantially parallel and arranged transverse to the line of movement of bar 48 but parallel to the axis of rotation of wheel 20. Lever 56 may be seen to comprise a multiplying lever arm in the installation.

Referring to Fig. 2, the braking mechanism is shown in unlocked position, namely, the braking shoe 52 is spaced from the tire 22. The lever 56 projects upwardly with the grip 58 within convenient reach of the chair's occupant. To apply the brake, lever 56 is manually rotated clockwise or toward the front of the chair as indicated by arrow 74. Upon rotation of said lever, the end 69 is rotated also in a clockwise direction effecting translation of the brake bar 48 to the left or toward tire 22 as shown in Fig. 3 to initiate braking action upon frictional engagement of shoe 52 with tire 22. Continued rotation of lever 56 will move the axes 62, 70 and 68 into alignment and when the edge 53 has depressed into the tire 22 as shown at 75, the lever will have moved to a position effecting automatic locking of the brake mechanism. The pivot 62 will be disposed on the outside of or below a straight line A projected between pivots 68 and 70. Movement of the lever to withdraw the brake shoe will be resisted on one side by the pivot 62. To move the pivot 62 to the opposite side of line A, it is necessary first to move the brake shoe against the tire so that such movement of the pivot 62 when at rest will be resisted by the resilience of the tire. Thus, locking of the brake mechanism is maintained by utilizing the resilience of tire 22. It will be appreciated that substantial braking force can be applied by means of the toggle joint described with a relatively small amount of strength by the chair occupant. In the case of an invalid lacking normal strength, this advantage is very important and desirable. To release the lever 56, same is manually rotated in the opposite or counterclockwise direction so that brake shoe 52 is translated in a direction retreating from wheel 20. The resilience of the tire is utilized to supply spring action to the toggle joint when unlocking same.

As seen in Fig. 1, the brake mechanism has been installed on the right side frame of the chair 10 considered from the direction the chair faces. The same principles may be employed for a brake mechanism 30 to be installed on the left side of the chair, however, the disposition of the bar 48 and the connections of the lever 56 and bell-crank 66 would be reversed with respect to the right-hand installation 30 of Fig. 1.

Since the diameter of the drive wheels may vary in different models, such as drive wheels having 20 inch or 24 inch diameters, it is desirable that the brake mechanism 30 be capable of use with either size wheel without necessity of changing its position of installation on a cross-bar 18. This advantage, of course, will enable suitable openings to be provided in the cross-bar 18 at the same distance from an end thereof regardless of the model chair on which found, and thereby simplify and decrease the cost of production. To accomplish this advantage, there is provided an elongate slot 78 in the curved seat 32 arranged parallel to the axis of the cross-bar. The bolts 34 are extended through said slot and the bracket is thereby enabled to slide on the bolts relative to the wheel 20 to permit positioning of the brake 30 closer to the rear support post 14 in the event a smaller diameter wheel 20 is employed or farther from said post when a larger diameter wheel is employed.

Although the brake 30 has been described as removably installed, it will be appreciatd that a permanent installation may also be employed. Likewise, where the drive wheels are installed at the front of the chair, the brake may be modified to effect application of the braking force of shoe 52 in the opposite direction without undue difficulty.

It is believed that the invention has been described in sufficient detail to enable a complete understanding thereof commensurate with the requirements of the patent laws. It is desired that the principles of the invention be construed in accordance with the broad scope thereof set forth in the claims appended hereto.

What it is desired to secure by Letters Patent of the United States is:

1. In an invalid wheel chair having a pair of interconnected side frames each rotatably mounting a drive wheel having a rubber tire thereon, a brake mechanism comprising a bracket for mounting said mechanism on a said side frame, a linearly reciprocable member and means on the bracket for mounting said member for sliding movement along a line perpendicular to the axis of rotation of the adjacent drive wheel, a brake shoe secured on said member, a lever arm pivotally secured on said bracket on an axis of pivot substantially normal to said line of movement of the reciprocable member, said lever arm and reciprocable member being interconnected by means of a toggle member pivotally secured to both said lever arm and said reciprocable member, said lever being pivotal between a first position spacing the brake shoe from the drive wheel to effect the unlocked position of the brake mechanism to a second position effecting translation of the brake member along said line of movement to cause frictional engagement of the brake shoe with the rubber tire and to force said shoe against a portion of said rubber tire to distort the same, said toggle member having the pivotal axes thereof arranged along a straight line offset from the axis of pivot of the lever arm when the lever is in said second position automatically to lock said lever in said second position in response to the restoration force exerted by the distorted portion of said rubber tire.

2. A braking mechanism as described in claim 1 in which said bracket has a downwardly opening, channel-shaped plate the legs of which provide said means, said reciprocable member having each end thereof protruding outwardly of a said leg and said brake shoe is secured to a said protruding end tranverse to the bar.

3. A braking mechanism as described in claim 1 in which said means comprises a channel-shaped plate opening downwardly, the legs of said channel having aligned perforations and the reciprocable member is slidably retained in said perforations with each end of said reciprocable members protruding beyond a said leg and the brake shoe is secured to a said protruding end.

4. A braking mechanism as described in claim 3 in which said brake shoe comprises a thin bar secured transversely to said reciprocable member and presenting a side edge thereof arranged to depress the peripheral edge of the tire when said second position is achieved.

5. A braking mechanism as described in claim 1 in which said toggle member comprises a swingable lever pivotally connected at the ends thereof between said lever arm and reciprocable member, said ends of the swingable lever being disposed on opposite sides of said axis of pivot.

6. A braking mechanism as described in claim 3 in which said axis of pivot is located on the side of the connecting web of the channel plate opposite to that on which the reciprocable member is disposed.

7. A braking mechanism as described in claim 1 in which said bracket includes a wide, curved seat at the upper end thereof for installing the mechanism on the side frame.

8. A braking mechanism as described in claim 7 in which said seat has an elongated slot therein parallel to said line of movement for permitting adjustment of the bracket relative to the said drive wheel.

9. In a wheel chair provided with a pair of vertical side frames each rotatably mounting a drive wheel carrying a resilient tire and at least one side frame having a horizontal, tubular cross-bar secured intermediate the ends of the frame: a brake mechanism comprising an integral bracket having a curved seat at the upper end thereof for complemental engagement with said cross-bar and fastening members for securing said seat flush with the cross-bar, said bracket including a horizontally arranged channel-shaped plate spaced below said seat and opening downwardly, an elongate bar slidably mounted on said plate below the connecting web thereof for linear reciprocable movement relative to the adjacent drive wheel, a brake shoe secured to the bar between the drive wheel and said bracket, a manually operable lever, and a toggle linkage interconnected between said lever and bar, said lever being pivotally mounted on the bracket and movable between a first position spacing the brake shoe from the tire to a second position wherein said shoe is depressed into the periphery of said resilient tire, the resiliency of said tire acting through said bar and said toggle linkage to lock said lever in said second position.

10. A brake mechanism as described in claim 9 in which said seat includes means for permitting the distance thereof from the drive wheel to be varied.

11. A brake mechanism as described in claim 9 in which the axis of pivot of the lever is disposed on the side of said connecting web opposite to that on which the bar is disposed.

12. A brake mechanism as described in claim 9 in which the legs of said channel plate are perforated and the bar is mounted between said legs in said perforations with each end of the bar protruding beyond a said leg, said brake shoe comprises a flat, planar member secured to a said end of the bar between said wheel and the adjacent leg and presenting a side edge to said tire, said tire having the peripheral edge thereof depressed by said side edge when said second position is achieved, the resilience of said tire urging said shoe outwardly therefrom in a snap movement after initial movement of said lever to unlock the mechanism.

13. A brake mechanism as described in claim 9 in which said toggle linkage comprises a bell-crank lever having the ends thereof pivotally connected between said manually operable lever and bar on opposite sides of said axis of pivot of the former, said axis of pivot being located outward of a straight line projected through the axes of pivot of the bell-crank lever when the second position is achieved.

14. A brake mechanism as described in claim 9 in which said toggle linkage comprises a bell-crank lever having the ends thereof pivotally connected between said manually operable lever and bar on opposite sides of said axis of pivot of the former, said axis of pivot being located outward of a straight line projected through the axes of pivot of the bell-crank lever when the second position is achieved, said brake shoe comprising a thin plate presenting a side edge thereof to said tire, said side edge being depressed into the periphery of the tire to achieve automatic locking of the brake mechanism in said second position.

References Cited in the file of this patent

UNITED STATES PATENTS

| | | |
|---|---|---|
| 608,865 | Jones | Aug. 9, 1898 |
| 2,667,945 | Caldeira | Feb. 2, 1954 |
| 2,782,870 | Sill | Feb. 26, 1957 |